United States Patent [19]

Miyajima et al.

[11] Patent Number: 5,229,447
[45] Date of Patent: Jul. 20, 1993

[54] ALKALI SOLUBLE PRESSURE SENSITIVE ADHESIVE COMPOSITIONS

[75] Inventors: Norihisa Miyajima; Tomohide Fukuzawa; Ikuo Yoshida, all of Saitama, Japan

[73] Assignee: Saiden Chemical Industry Co., Ltd., Tokyo, Japan

[21] Appl. No.: 819,392

[22] Filed: Jan. 10, 1992

[30] Foreign Application Priority Data

Jul. 12, 1991 [JP] Japan .................. 3-198518
Sep. 13, 1991 [JP] Japan .................. 3-262822

[51] Int. Cl.$^5$ .................. C08K 5/06; C08L 31/00
[52] U.S. Cl. .................. 524/377; 524/556; 524/762; 526/318.41; 526/318.42
[58] Field of Search .......... 524/377, 558, 762, 556, 524/389; 526/279, 318.41, 318.42

[56] References Cited

U.S. PATENT DOCUMENTS

| | | | |
|---|---|---|---|
| 3,894,980 | 7/1975 | DeTommaso | 526/318.41 |
| 4,421,902 | 12/1983 | Chang et al. | 526/318.41 |
| 4,491,650 | 1/1985 | Rizk et al. | 526/279 |
| 4,746,543 | 5/1988 | Zinkan et al. | 524/377 |
| 5,045,587 | 9/1991 | Tanaka | 524/556 |

Primary Examiner—Paul R. Michl
Assistant Examiner—LaVonda R. DeWitt
Attorney, Agent, or Firm—Webb, Burden, Ziesenheim & Webb

[57] ABSTRACT

The present invention provides an alkali soluble pressure sensitive adhesive composition comprising 100 parts by weight of a polymer obtained by polymerization of carboxyl group-containing vinyl monomer as an adhesive component and 50-500 parts by weight of a nonionic surface active agent capable of endowing plasticity as a main additive component.

The tack papers or the adhesive tapes using the adhesive compositions according to the invention can be readily dissolved in alkali water in the step of repulping and the reclaimed papers without adhesiveness can be prepared with them.

Further, the alkali soluble pressure sensitive adhesive compositions of the present invention are excellent in moisture dependence, tack properties at low temperatures and bleeding properties at high temperatures. Especially, the compositions are improved in shearing strength by adding cross-linking agents and are improved in adhesiveness to glass by adding silane coupling agents, and so are suitable for labels and the like of beer bottles, etc.

10 Claims, No Drawings

ALKALI SOLUBLE PRESSURE SENSITIVE ADHESIVE COMPOSITIONS

FIELD OF THE INVENTION

The present invention relates to alkali soluble pressure sensitive adhesive compositions, which can be used to various uses as tacky papers or adhesive tapes, and can be readily dissolved in alkali water to lose the adhesiveness on paper-making by repulping them for the sake of conservation of resources, etc.

BACKGROUND OF THE INVENTION

Recently, importance of repulping techniques for preparing reclaimed papers from used papers has been increased because of finite forest resources.

Adhesive papers coated with adhesives are sold as memoranda pads and the like. When these adhesive papers are mixed in usual used papers to be reclaimed, various problems caused by their adhesives are aroused in the steps of repulping. In order to solve the problems in the steps of repulping, some suggestions have been made.

Japanese Patent Laid-Open Publication No.74486/1991 discloses adhesive compositions which comprise modified copolymers, hydrogenated rosin and polyethylene glycol, wherein the modified copolymers are obtained by copolymerizing acrylate, $\alpha,\beta$-ethylenic unsaturated dicarboxylic acid and assistant monomers such as vinyl acetate, styrene, methyl methacrylate and the like, subsequently esterifying thus obtained copolymer with nonionic agents, and thereafter, neutralizing with alkali. Of these compositions, the neutralized or esterified parts derived from the unsaturated dicarboxylic acid and the assistant monomers are soluble in water, but the main component derived from acrylate are essentially difficult to dissolve in water. On the account, the adhesive compositions remain without solubilized after repulping by sticking to the used papers or by making granular dispersed particles. These adhesive dispersed particles make trouble in the repulping process because they clog filters on filtrating the residues. Further, the adhesive dispersed particles cause occurrence of tacks on paper making, and have a bad influence on the quality of the product papers.

Japanese Patent Publication No.23294/1974 discloses adhesives composed of copolymers and nonionic surface active agents wherein the copolymers are formed by copolymerization of monomers without carboxyl group such as vinyl ester, acrylate, methacrylate, ethylene, stylene, methyl vinyl ether, vinyl chloride, acrylonitrile, etc. and monomers with carboxyl group such as acrylic acid, methacrylic acid, crotonic acid, itaconic acid, maleic acid, fumaric acid, aconitic acid, monoalkyl maleic acid, monoalkyl fumaric acid, monoalkyl itaconic acid, etc. The adhesives are not suitable from the viewpoint of repulping since they also have water-insoluble parts like those described above.

Japanese Patent Laid-Open Publication No. 33926/1977 disclose adhesives obtained by adding water soluble plasticizers to copolymers of polymerizable vinyl monomers having carboxyl group and basic monomers. To the adhesives, water soluble plasticizers such as polyvalent alcohol, polyetherpolyol, polypropylene glycol and the like are added in order to acquire capability of water solubility for repulping. However, these water soluble plasticizers are apt to cause bleeding when the adhesives are applied to base papers. Further, on bonding adhesive tapes to paper products, the water soluble plasticizers of the adhesives are transferred to papers and are apt to arouse problems of paper contaminations.

Furthermore, U.S. Pat. No. 3,865,770 discloses adhesives which are obtained by neutralizing copolymers of acrylates and vinyl carboxylic acids with alkanolamines.

OBJECT OF THE INVENTION

The present invention is made in viewpoint of the aforementioned prior arts, and an object of the present invention is to provide alkali soluble pressure sensitive adhesive compositions which are improved in such defects in usual water-soluble adhesives as moisture dependence, insufficiency of tack at low temperatures, bleeding at high temperatures, and shortage of shearing strength, moreover, are excellent in alkali dissolubility for the repulping process and are free from tack after paper making.

SUMMARY OF THE INVENTION

The alkali soluble pressure sensitive adhesive compositions of the present invention comprise 100 parts by weight of polymers obtained by polymerizing vinyl monomers having carboxyl group, and 50–500 parts by weight of nonionic surface active agents capable of endowing plasticity.

DETAILED DESCRIPTION OF THE INVENTION

The aforementioned alkali soluble pressure sensitive adhesive compositions are prepared principally by one of the following four processes.

1. A process comprising a step of polymerizing carboxyl group-containing vinyl monomers in aqueous solvent, and a step of adding surface active agents capable of endowing plasticity to the aqueous solution of obtained polymers.

2. A process comprising a step of polymerizing carboxyl group-containing vinyl monomers in the aqueous solution in which surface active agents capable of endowing plasticity are dispersed or dissolved.

3. A process comprising a step of polymerizing carboxyl group-containing vinyl monomers in organic solvent, and a step of adding surface active agents capable of endowing plasticity to the solution of obtained polymers.

4. A process comprising a step of polymerizing carboxyl group-containing vinyl monomers in the organic solvent solution in which surface active agents capable endowing plasticity are dispersed or dissolved.

Examples of the carboxyl group-containing polymerizable vinyl monomers include acrylic acid, methacrylic acid, maleic acid, maleic anhydride, fumaric acid, fumaric anhydride, itaconic acid and crotonic acid. Of these, preferred are acrylic acid and methacrylic acid. Particularly, a homopolymer of acrylic acid or a copolymer of acrylic acid with methacrylic acid exhibits excellent properties.

Examples of the surface active agents capable of endowing plasticity include nonionic surface active agents having ethylene oxide groups, for example, alkyl aryl ethers such as polyoxyethylene nonylphenyl ether, polyoxyethylene octyl phenyl ether; alkyl ethers such as polyoxyethylene lauryl ether, polyoxyethylene oleyl ether; alkyl ester such as polyoxyethylene laurate, polyoxyethylene oleate, sorbitan oleate, alkyl ether phosphates, and ethyleneoxide/propyleneoxide block copolymers such as PLURONIC and TETRONIC (Trade Name, manufactured by Asahi Denka K.K.). Furthermore, anionic surface active agents having ethylene oxide groups can be used.

The procedures for polymerization of the carboxyl group-containing vinyl monomers will be described hereinafter.

The base polymers can be obtained, for example, by the polymerization of acrylic acid in water using water-soluble polymerization initiators such as hydrogen peroxide, potassium persulfate and ammonium persulfate, or by that in organic solvent like methyl alcohol, ethyl alcohol, isopropyl alcohol, acetone using hydrophobic polymerization initiators such as benzoyl peroxide, lauryl peroxide, azobisisobutyronitrile, azobiscyanovaleric acid. The polymerizability in the aqueous medium polymerization can be enhanced by the addition of inorganic salts such as sodium phosphate, sodium phosphite, sodium pyrophosphate, sodium tripolyphosphate and sodium bicarbonate. The control of the molecular weight of the base polymer can be easily carried out by controlling the amount of polymerization initiators or by using known polymerization adjusting agents. The molecular weight affects tack and other various properties, and preferred are 200,000–1500,000 of the molecular weight of the base polymer in terms of polyacrylic acid.

When the base polymers obtained in this manner are applied to dry films, they are difficult to dissolve in water but dissolve in alkali water. Further, when the polymerization reaction is performed in organic solvent, the base polymers can be prepared for example, in methyl alcohol solvent alone or that mixed with other organic solvents, and in the solvent in the presence of a small amount of water.

Preparation of the pressure sensitive adhesive compositions according to the present invention is carried out either by the process comprising a step of adding the nonionic surface active agents after preparing the base polymers or by the process comprising a step of polymerizing carboxyl group-containing vinyl monomers in the medium in which a part or all of the surface active agents are added. When the surface active agents are added to the reaction medium, it is necessary to select suitably the amount and kind of the surface active agents. The addition of the surface active agents being likely to cause an esterification reaction, raise the reaction temperature slightly. Therefore, some kinds of surface active agents which increase their viscosity with elevating temperature and deteriorate the viscosity (i.e.; which decrease the flowability of the polymer composition) are judged to have inferior compatibility.

For the adhesives having well-balanced properties, HLB of the surface active agents to be added is preferably 10 to 16, to enhance the plasticizability. The surface active agents with HLB of less than 10 are unusable, since their cohesive strength is insufficient to prevent bleeding. If those having HLB of more than 16 are employed, the desired tacks are not attained. However, a mixture of the surface active agents having HLB of less than 10 and those having HLB of more than 16 can be employed. The surface active agents are used in an amount of 50–500 parts by weight per 100 parts by weight of the base polymer in terms of non-volatile parts. In particular, 100 to 250 parts by weight of the surface active agents are preferably used.

The dry films of the pressure sensitive adhesive compositions obtained thus are insoluble in water and highly soluble in alkali water. Furthermore, it is effective to add cross-linking agents reactable with active hydrogens of the carboxyl groups in order to enhance the cohesive strength and improve bleeding properties at high temperatures and high humidities. Examples of the cross-linking agents include poly-valent metal salts such as acetates or sulfates of metals like magnesium, aluminum, calcium and zinc; metal chelates such as aluminum trisacetylacetonate, ethylacetoacetatealuminum diisopropylate, aluminum monoacetylacetonate bisethylacetoacetate, etc.; aziridine compounds such as diphenylmethane bis-4,4′, N,N′-diethyleneurea, 2-(1-aziridinyl)ethylmethacrylate, 1,6-hexamethylene diethylene urea, etc.; epoxy compounds such as 1,6-hexanediol diglycidyl ether, glycerolpolyglycidyl ether; and other known agents like melamines. These cross-linking agents are preferably used in amounts of 0.01 to 5 parts by weight per 100 parts by weight of the base polymers.

Further, the compositions used for glass bottles, which are required to have water-proof adhesiveness, are prepared with excellent performance by the addition of 0.01–5 parts by weight of silane coupling agents into the base polymers during or after polymerization reactions. Examples of silane coupling agents include vinyltrichlorosilane, vinyltriethoxysilane, vinyltrimethoxysilane, γ-methacryloxypropyltrimethoxysilane, γ-glycidoxypropyltrimethoxysilane, γ-mercaptopropyltrimethoxysilane and the like.

Furthermore, alkali-soluble tackifiers in natural resins or petroleum resins and poly-valent alcohols capable of adding adhesiveness can be used so long as they do not mar the suitable properties of the pressure sensitive adhesive compositions.

EFFECT OF THE INVENTION

The alkali soluble pressure sensitive adhesive compositions of the present invention comprise 100 parts by weight of polymers obtained by polymerization of carboxyl group-containing vinyl monomers as an adhesive component and 50–500 parts by weight of surface active agents capable of endowing plasticity as a main additive component.

The tack papers or the adhesive tapes using the adhesive compositions according to the invention can be readily dissolved in alkali water in the step of repulping and the reclaimed papers without adhesiveness can be prepared with them.

Further, the alkali soluble pressure sensitive adhesive compositions of the present invention are excellent in moisture dependence, tack properties a low temperatures and bleeding properties at high temperatures. Especially, the compositions are improved in shearing strength by adding cross-linking agents and are improved in adhesiveness to glass by adding silane coupling agents, and so are suitable for labels and the like of beer bottles etc.

EXAMPLES

The present invention will be further described with examples hereinafter.

EXAMPLE 1

Two hundred parts by weight of water and 0.5 parts by weight of sodium bicarbonate were placed in a reaction vessel equipped with a cooling tube, a nitrogen inlet, a thermometer and a stirring bar, and were stirred while replacing with nitrogen.

A solution consisting of 100 parts by weight of acrylic acid and 70 parts by weight of water, and 20 parts by weight of potassium persulfate solution (concentration of 0.5 wt. %) as a polymerization initiator were prepared respectively in separate vessels.

When inner temperature of the reaction vessel was raised to 88° C. by heating, the above acrylic acid aqueous solution and the potassium persulfate aqueous solution were successively added dropwise from separate inlets to initiate the polymerization reaction. After the reaction temperature was raised to 93° C. and the dropping was continued for 3 hours at the temperature. After finishing the dropping, the polymerization reaction was terminated by keeping the temperature for 2 hours. The transparent base polymer was obtained by cooling the reaction mixture. Next, 30 parts by weight of polyoxyethylene octylphenyl ether (nonionic surface active agent of ethyleneoxide addition mole number 7 and HLB 12.2) was added to 100 parts by weight of the base polymer. The mixture was stirred for 2 hours at 50° C. and the alkali soluble pressure sensitive adhesive composition was obtained.

EXAMPLE 2

Two hundred parts by weight of water, 0.2 part by weight of sodium phosphate and 5 parts by weight of polyoxyethylene nonyl phenylether (nonionic surface active agent of ethyleneoxide addition mole number 13 and HLB 14.5) were placed in the same reaction vessel as described in Example 1, and were stirred while replacing with nitrogen.

A solution consisting of 95 parts by weight of acrylic acid, 5 parts by weight of methacrylic acid and 70 parts by weight of water, and 20 parts by weight of potassium persulfate solution (concentration of 0.5 wt. %) as a polymerization initiator were prepared respectively in separate vessels.

The polymerization reaction was carried out in the same manner as described in Example 1, and the slightly opaque base polymer was obtained. Next, 20 parts by weight of polyoxyethylene nonylphenyl ether (nonionic surface active agent of ethyleneoxide addition mole number 13 and HLB 14.5) and 15 parts by weight of polyoxyethylene laurylether (nonionic surface active agent of ehtyleneoxide addition mole number 5 and HLB 10.8) was added to 100 parts by weight of the base polymer. The mixture was stirred for 2 hours at 50° C. and the alkali soluble pressure sensitive

EXAMPLE 3

Two parts by weight of 1,6-hexanediol diglycidyl ether, as a cross-linking agent was added to 100 parts by weight of the adhesive composition obtained in Example 1, and the alkali soluble pressure sensitive adhesive composition was obtained.

EXAMPLE 4

The alkali soluble pressure sensitive adhesive composition was obtained by adding 0.8 part by weight of γ-aminopropyltriethoxy silane to the adhesive composition obtained in Example 3.

EXAMPLE 5

Two hundred and fifty parts by weight of methanol and 0.5 part by weight of benzoyl peroxide were placed in the reaction vessel equipped with a cooling tube, a nitrogen inlet, a thermometer and a stirring bar, and were stirred while replacing with nitrogen.

Subsequently, 100 parts by weight of acrylic acid was added to the reaction vessel. The polymerization reaction was carried out by heating. The reaction was continued at 73° C. for 6 hours and cooled, and the transparent base polymer was obtained. Next, 40 parts by weight of polyoxyethylene octylphenyl ether (nonionic surface active agent of ethyleneoxide addition mole number 7 and HLB 12.2) was added to 100 parts by weight of the base polymer. The mixture was stirred for 2 hours at 50° C. and the alkali soluble pressure sensitive adhesive composition was obtained.

COMPARATIVE EXAMPLE 1

The solution polymerization was carried out with 40 parts by weight of butyl acrylate, 40 parts by weight of vinyl acetate, 20 parts by weight of acrylic acid and 1 part by weight of azobisisobutylnitrile as a polymerization initiator in a 150 parts by weight of mixed solvent of methanol and ethyl acetate, and the base polymer was obtained. Subsequently, 30 parts by weight of polyoxyethyleneoctylphenylether (nonionic surface active agent of ethyleneoxide addition mole number 7 and HLB 12.2) was added to 100 parts by weight of the base polymer. The mixture was stirred for 2 hours at 50° C. and the adhesive composition was obtained.

COMPARATIVE EXAMPLE 2

The solution polymerization of the mixture comprising 90 parts by weight of acrylic acid, 10 parts by weight of dimethylaminoethylacrylate, 1 part by weight of azobisisobutylonitrile and 300 parts by weight of isopropylalcohol was carried out and the base polymer was obtained. Subsequently, 350 parts by weight of a polyether polyol, SANNIX TP-400 (manufactured by Sanyo Kasei K.K.), and 1050 parts by weight of water were added to 100 parts by weight of the base polymer, and the water-soluble adhesive composition was obtained by mixing uniformly the solution.

The adhesive compositions obtained in Examples and Comparative Examples were evaluated in the following methods. The base materials of the tack papers employed were fine papers 55K and the coating amount was 25 g/m$^2$.

Adhesive Strength

After a release paper was torn off from a test piece cut in 25×150 mm, the test piece was contacted and bonded on the SUS 304 plate by using a contact bonding apparatus defined by JIS Z-0237. After 60 minutes, the 180 degree tearing adhesive strength was measured by using an Universal Tensile Testing Instrument. The pulling rate employed was 300 mm/min.

Holding Power (Distance of Deviation)

A 25×25 mm area of the test piece was contacted and bonded on the one end of the cleaned SUS 304 plate by a bonding roller in accordance with JIS Z-0237. After 20 minutes, one end of the test piece was tacked with a clasp in such a way that the test piece hanged vertically and a 1 Kg weight was set on the end of the test piece. After 5 hours at 40° C., the distance of deviation was measured. When the test piece dropped down in the course of the test, the holding time was indicated.

Loop Tack

The test was carried out by using a Model UTM-4 Universal Tensile Testing Instrument (manufactured by Orienteck Co.). The head and tail of the test piece cut in 25×150 mm were overlapped 15 mm in length and inserted in a chuck of the universal tensilon machine to form a loop having 31.85 mm of the circumference. Subsequently, the polished SUS 304 in accordance with JIS Z-0237 was elevated at a rate of 300 mm/min and contacted with the loop. The distance of the SUS plate to the lowest part was set to be 20 mm. When the SUS plate was elevated to the certain position, the test piece was contacted with the SUS plate in a state of the crushed loop. After bonding, the SUS plate was soon lowered at a rate of 300 mm/min. The observed adhesiveness of the SUS plate to the test piece was adopted as the loop tack.

Bleeding

This test was carried out with the aim of measuring a degree of the bleeding tendency that an adhesive or component thereof penetrates into the applied paper, when the paper was exposed to high humidities and temperature. Roll samples with 150 mm diameter and sheet samples were prepared by the known process for preparing tack papers using a coating machine with three rolls in the top-feed method. The prepared samples were allowed to stand at atmosphere of 70° C. and at 50° C. and a humidity of 90% for 14 days respectively. The samples was taken out and the release paper was taken away from the sample. In order to examine the presence of bleedings, the samples tested was compared with a blank sample while exposing light by changing irradiating angles.

Repulping

Two hundred and ninety seven parts by weight of water and 3 parts by weight of sodium hydroxide were placed in the prepared vessel. The release paper was taken out from the tack paper cut in 10×10 mm, and 30 parts by weight of the tack paper was placed in the vessel. The vessel was kept at 60° C., allowed to stand for 30 minutes and stirred at 500 rpm/min for 3 hours. Then, residues were obtained by filtering using a filter paper. After the residues were washed with water and dried, the weight and the tack of the residues were measured.

If adhesives are not dissolved, tacks appear by contaminating the residues of adhesives. The samples observed tacks in the residues were regarded as failure because of lack of alkali dissolubility, and the samples given the residues without tacks are determined to be passed.

Adhesiveness to Glass Bottles

The release papers were removed from the samples cut in 30×30 mm. Then the samples were adhered to beer bottles and allowed to stand at room temperature for 3 days. Then, the samples were immersed in water of the normal temperature and the adhesion time was measured until the samples exfoliate from the bottles.

| | Testing Result | | | | | |
|---|---|---|---|---|---|---|
| | Adhesive strength (g) | Holding power | Loop Tack (g) | Bleeding (presence) | Repulping | Adhesion to glass |
| Ex. 1 | 1500 | 3 mm | 950 | not observed | pass | 1 hour |
| Ex. 2 | 1800 | 5 mm | 850 | not observed | pass | — |
| Ex. 3 | 1700 | not observed | 800 | not observed | pass | 2 hours |
| Ex. 4 | 1700 | not observed | 800 | not observed | pass | 10 hours |
| Ex. 5 | 1550 | not observed | 850 | not observed | pass | — |
| Compar. Ex. 1 | 1700 | 1 mm | 800 | slightly observed | failure | — |
| Compar. Ex. 2 | 1300 | 3 mm | 700 | observed | failure | — |

What is claimed is:

1. An alkali soluble pressure sensitive adhesive composition comprising, in solution, 100 parts by weight of a polymer obtained by polymerizing the carboxyl group-containing vinyl monomer and 50–500 parts by weight of a nonionic surface active agent capable of endowing plasticity.

2. The alkali soluble pressure sensitive adhesive composition according to claim 1 comprising the polymer obtained by polymerizing the carboxyl group-containing vinyl monomers in an aqueous solvent and the nonionic surface active agent capable of endowinq plasticity.

3. The alkali soluble pressure sensitive adhesive composition according to claim 1 prepared by polymerizing the carboxyl group-containing vinyl monomers in the aqueous solution dispersed or dissolved the nonionic surface active agent capable of endowing plasticity.

4. The alkali soluble pressure sensitive adhesive composition according to claim 1 comprising the polymer obtained by polymerizing the carboxyl group-containing vinyl monomers in an organic solvent and the nonionic surface active agent capable of endowing plasticity.

5. The alkali soluble pressure sensitive adhesive composition according to claim 1 preparing by polymerizing the carboxyl group-containing vinyl monomers in the organic solvent dispersed or dissolved the nonionic surface active agent capable of endowing plasticity.

6. The alkali soluble pressure sensitive adhesive composition according to claim 1 wherein the carboxyl group-containing vinyl monomers are acrylic acid and/or methacrylic acid.

7. The alkali soluble pressure sensitive adhesive composition according to claim 1 further comprising 0.01 to 5 parts by weight of a silane coupling agent per 100 parts by weight of the polymer obtained by polymerizing the carboxyl group-containing vinyl monomers.

8. The alkali soluble pressure sensitive adhesive composition according to claim 7 wherein the silane coupling agent is at least one kind of compounds selected from a group consisting of vinyltrichlorosilane, vinyltrimethoxysilane, vinyltri-ethoxysilane, γ-methacryloxypropyltrimethoxysilane, γ-glycidoxypropyltrimethoxysilane and γ-mercaptopropylmethoxysilane.

9. The alkali soluble pressure sensitive adhesive composition according to claim 1 further comprising a cross-linking agent.

10. The alkali soluble pressure sensitive adhesive composition according to claim 1 wherein the nonionic surface active agent capable of endowing plasticity has a polyethyleneoxide group or an ethyleneoxide/propyleneoxide block copolymer group.

* * * * *